United States Patent [19]
Yoneda

[11] Patent Number: 5,882,752
[45] Date of Patent: Mar. 16, 1999

[54] WRAPPING PIPE FOR A BUNDLE OF HOLLOW FIBERS, METHOD AND DEVICE FOR PRODUCTION THEREOF

[75] Inventor: Atsushi Yoneda, Ohtsu, Japan

[73] Assignee: Nissho Corp., Osaka-fu, Japan

[21] Appl. No.: 829,617

[22] Filed: Mar. 31, 1997

Related U.S. Application Data

[63] Continuation of Ser. No. 355,242, Dec. 9, 1994, abandoned.

[30] Foreign Application Priority Data

Dec. 10, 1993 [JP] Japan .................................. 5-341684

[51] Int. Cl.[6] .................................................. B29C 47/90
[52] U.S. Cl. ..................... 428/36.92; 428/36.9; 428/141; 428/57
[58] Field of Search ................................ 428/36.92, 36.9, 428/57, 141

[56] References Cited

U.S. PATENT DOCUMENTS 4,663,107  5/1987  Takada et al. .......................... 264/519

*Primary Examiner*—Charles Nold
*Attorney, Agent, or Firm*—Birch, Stewart, Kolasch, & Birch, LLP

[57] ABSTRACT

A wrapping pipe for a bundle of hollow fibers comprises a plastic sheet welded at its opposing edges by ultrasonics and having no difference in level of the inner surface.

4 Claims, 4 Drawing Sheets

WRAPPING PIPE FOR A BUNDLE OF HOLLOW FIBERS, METHOD AND DEVICE FOR PRODUCTION THEREOF

This application is a continuation, of application Ser. No. 08/355,242 filed on Dec. 9, 1994, now abandoned.

BACKGROUND OF THE INVENTION

FIELD OF THE INVENTION

The present invention relates to a wrapping pipe for a bundle of hollow fibers and, more particularly, a tubular member for protecting a bundle of hollow fibers from breakage or contamination until the bundle of the hollow fibers is loaded into a housing or a cylindrical container of blood treatment devices used for hemodialysis, hemofiltration, hemodiafiltration or the like.

DESCRIPTION OF THE BACKGROUND ART

When applying hollow fibers to blood treatment devices such as dialyzer, it is custom to protect hollow fibers from damage or contamination until a bundle of the hollow fibers are loaded into a cylindrical container of the blood treatment device. The protection of hollow fibers has been carried out with a satin finished sheet or an extruded pipe of plastics. For example, the hollow fibers are protected by winding the plastic sheet round a bundle of hollow fibers and fixing an overlapped portion of the plastic sheet with several pieces of an adhesive tape as illustrated in FIG. 5, or by loading a bundle of hollow fibers into an extruded plastic pipe as shown in FIG. 6.

However, such protective members have some problems awaiting a solution. For example, the use of the plastic sheet is troublesome. In addition, when winding the plastic sheet round the bundle of hollow fibers, the outermost hollow fibers of the bundle are frequently damaged as they are caught in an overlapping portion between the inner and outer ends of the sheet, causing leakage of the blood during blood treatment. Further, the hollow fibers caught in the overlapping portion of the sheet are folded down when loading into the cylindrical container, causing blockage or folds of the hollow fibers. Thus, one must replace the damaged hollow fibers with new ones to avoid leakage of the blood. Other troubles are that some sheets wound round the hollow fibers are turned down at the corner of its outer end and that some wrapped articles of the hollow fibers get a flat configuration. In such cases, the wrapped articles are occasionally caught in a conveying device during automatic transportation, resulting in discontinuation of the wrapping operation.

Some of the above problems caused in the use of the sheet are solved by use of the extruded pipe. However, it is impossible with the current extrusion molding techniques to produce extruded pipes with a satin finished inner surface. Since the extruded pipe has a mirror finish inner surface, the coefficient of friction between the pipe and hollow fibers is large when pulling out the hollow fibers from the extruded protective pipe to load them into the cylindrical container for the blood treatment device, resulting in damages due to bends of the hollow fibers. Thus, it is required to replace the damaged hollow fibers with new ones.

SUMMARY OF THE INVENTION

It is therefore an object of the present invention to provide a pipe for wrapping a bundle of hollow fibers, that makes it possible to prevent the hollow fibers from being caught in the sheet or folded down when loading them into the wrapping pipe or taking out of the pipe.

Another object of the present invention is to provide a wrapping pipe for a bundle of hollow fibers, which is prevented from being caught in a conveying device during automatic transportation.

A further object of the present invention is to provide a method and a device for production of wrapping pipes for hollow fibers.

According to the present invention, these and other objects are solved by providing a wrapping pipe for a bundle of hollow fibers, consisting of a plastic sheet in the form of a hollow cylinder, the sheet being welded at longitudinal opposing sides thereof by ultrasonics and having no difference in level of an inner surface thereon.

Preferably, the wrapping pipe has an inner surface with a center line mean roughness (Ra), defined in JIS-B-0601, ranging from 3.0 to 4.5 $\mu$m.

As a material for the plastic sheet, there may be used those such as olefin resin, polyesters, polytetrafluoroethylene. It is preferred to use olefin resin such as polyethylene, polypropylene, polybutylene and the like from the economical or processing point of view.

The above wrapping pipe may be prepared, for example, by a method including the steps of (a) cutting a plastic sheet to a predetermined width;
(b) rounding the sheet into a cylindrical form partially overlapped at opposing longitudinal sides of the sheet;
(c) welding the overlapped portion of the sheet by ultrasonics to form a pipe with no difference in level of its inner surface; and
(d) cutting the resultant pipe to a predetermined length.

The above wrapping pipe can be produced by a device comprising:

a sheet cutting station for cutting a continuously transferred plastic sheet to a predetermined width;

a sheet drawing station for feeding the plastic sheet to said sheet cutting station and for feeding the cut sheet to the next station;

a sheet rounding station for rounding the cut sheet so as to provide a cylindrical form with a partially overlapped portion at the opposing longitudinal sides thereof;

a pipe shaping station for joining the overlapped portion of the sheet by ultrasonic welding to form a pipe with a seamless inner surface; and a pipe cutting station for cutting the pipe to a predetermined length.

The pipe shaping station is composed of a mold having a through-hole passing therethrough in the longitudinal direction thereof and a slit provided in the mold for insertion of the ultrasonic welding horn into the through-hole; a cylindrical core rod arranged coaxially with the through-hole of the mold for rounding the sheet; a ultrasonic welding means having a welding horn for applying ultrasonic waves to a surface of an overlapped portion of the plastic sheet fed between the mold and cylindrical core rod.

In the above device, a plastic sheet is drawn from a sheet roll by the sheet drawing station and fed to the sheet cutting station where the sheet is cut to a predetermined width. The sheet is then fed to the sheet rounding station where the sheet is rounded into a cylindrical form so that the opposing sides of the sheet are partially overlapped to each other. The rounded sheet is then introduced into a space formed between the mold and the core rod so that the overlapped portion of the sheet is located beneath the slit of the mold, and then welded by ultrasonic waves.

The above and other objects, features and advantages of the present invention will become apparent from the following description taken in conjunction with the preferred embodiments thereof with reference to the accompanying drawings.

DETAILED DESCRIPTION OF THE PREFERRED EMBODIMENTS

Figure 1:
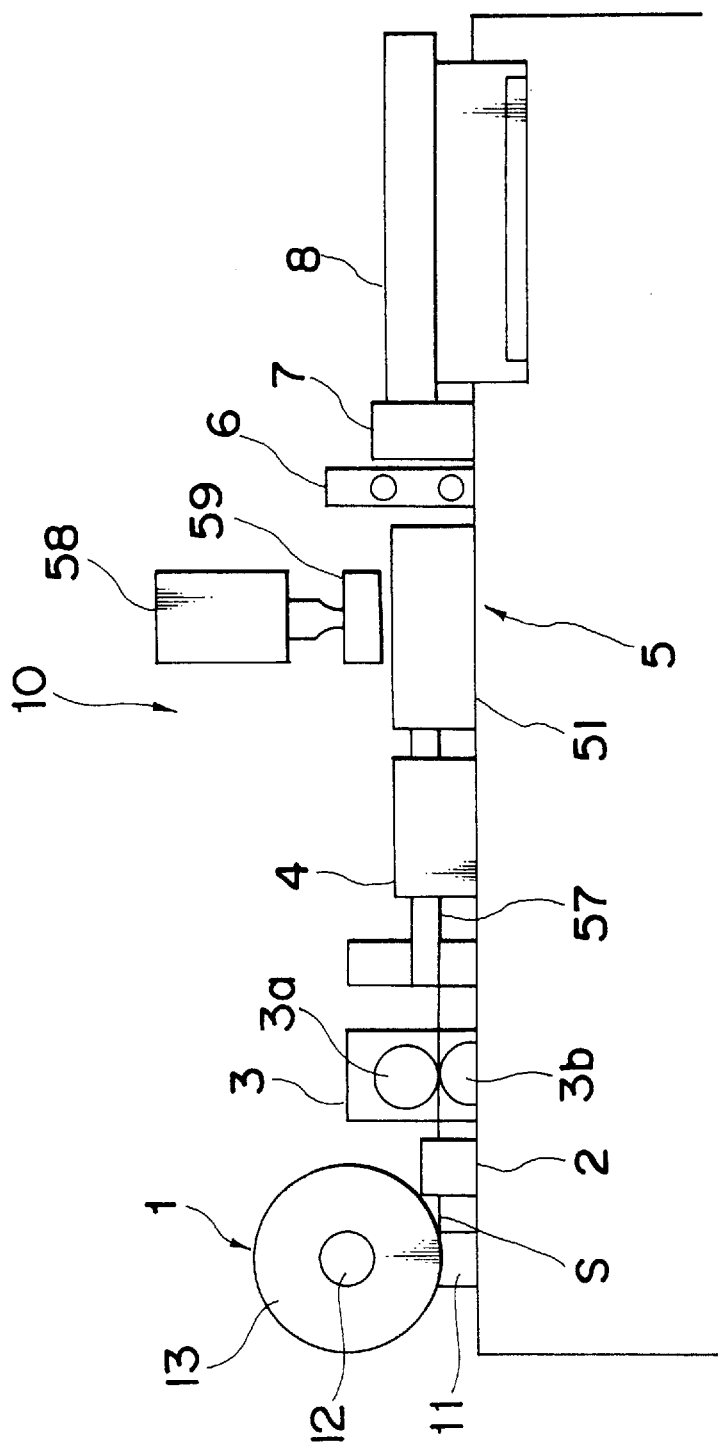
FIG. 1 is a side view of a device for production of pipes for wrapping a bundle of hollow fibers.
Figure 2:
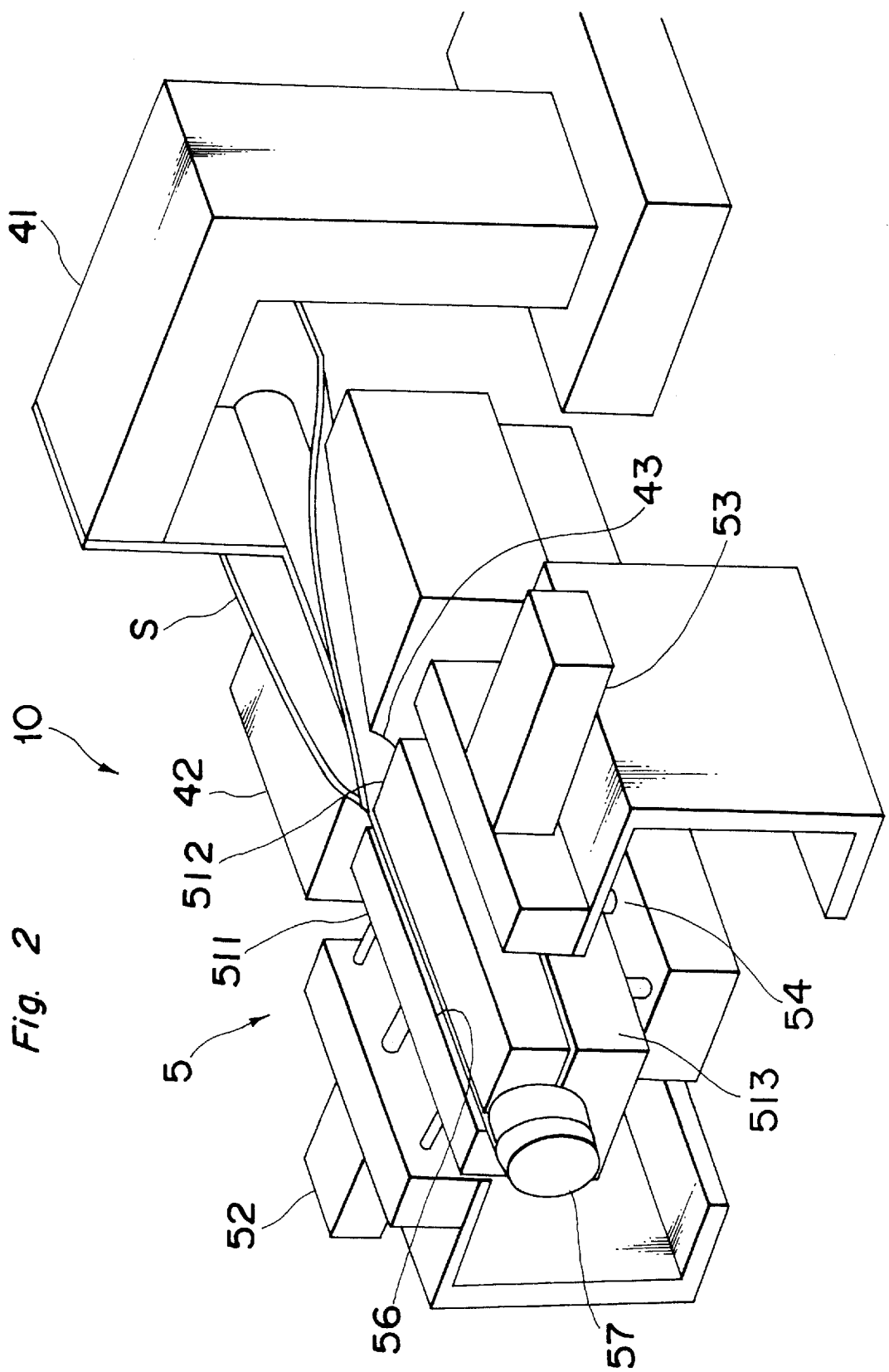
FIG. 2 is a perspective view illustrating a pipe shaping station in the device of FIG. 1.
Figure 3:
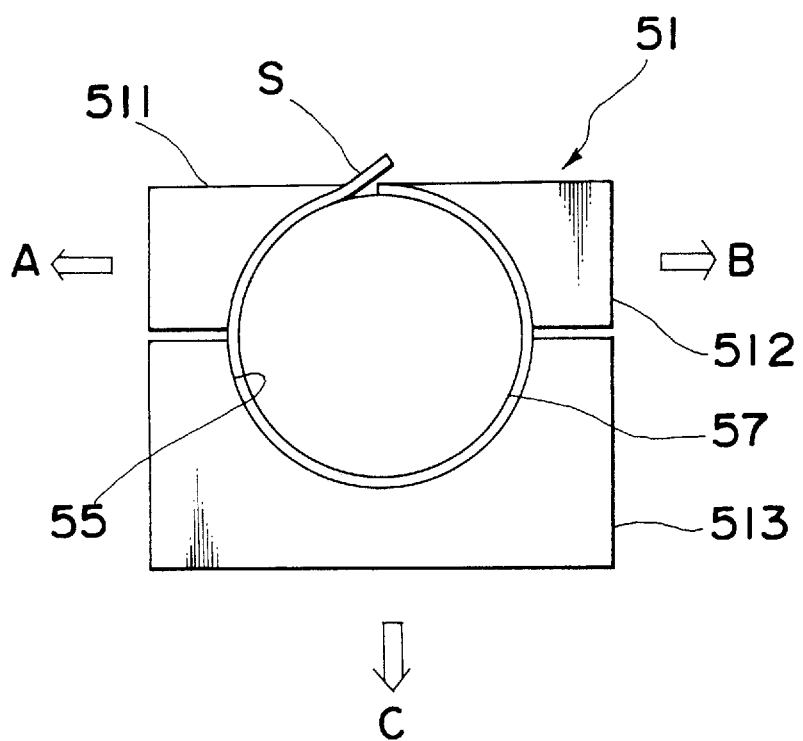
FIG. 3 is a section view of the pipe shaping station of FIG. 2.
Figure 4:
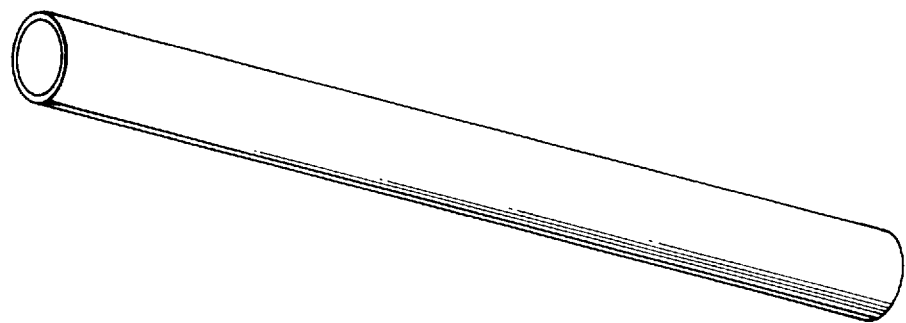
FIG. 4 is a perspective view of a wrapping pipe according to the present invention.
Figure 5:
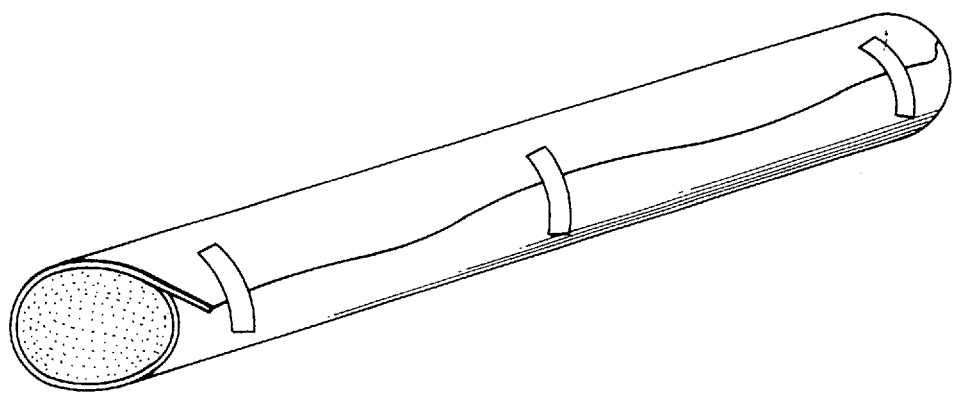
FIG. 5 is a perspective view illustrating an example of a wrapping pipe of the prior art.
Figure 6:
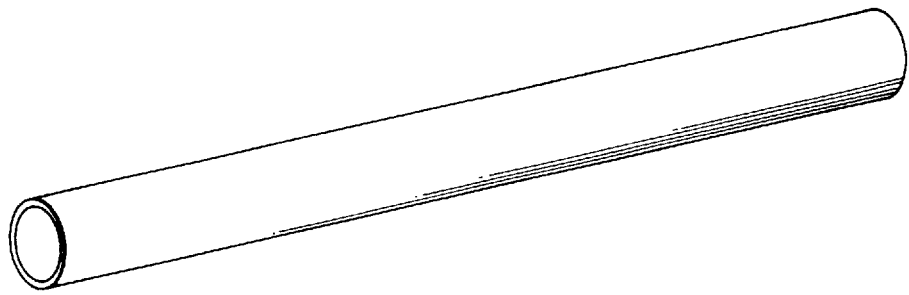
FIG. 6 is a perspective view illustrating another example of a wrapping pipe of the prior art.

Referring now to FIGS. 1 to 3, there is shown a device for manufacturing wrapping pipes for wrapping a bundle of hollow fibers according to the present invention, which comprises a sheet roll holding station 1, a sheet cutting station 2 for cutting a plastic sheet to a predetermined width, a sheet drawing station 3, a sheet rounding station 4 for guiding the sheet to the next station while rounding it into a cylindrical form overlapped at the opposite longitudinal sides of the sheet, a pipe shaping station 5 for welding the overlapped portion of the rounded sheet with ultrasonics to form a pipe, a pipe drawing station 6, a pipe cutting station 7 for cutting the pipe to a predetermined length, and a pipe ejecting station 8. These stations are arranged along the course of the plastic sheet.

The sheet roll holding station 1 comprises a roll stand 11 and a sheet roller 12 which is rotatably mounted on the stand 11 and holds a roll 13 of plastic sheet S wound thereon. The plastic sheet S is drawn out from the sheet roll 13 by the sheet drawing station 3 and fed to the sheet cutting station 2 where the sheet is cut to a predetermined width. The width of the sheet S is determined on the basis of an inside diameter of the wrapping pipe to be produced so that it equals to the sum of a peripheral length of the pipe and an overlapping width of the opposing sides of the sheet S. The overlapping width of the sheet S is generally determined so as to have a length approximately equal to a width of the ultrasonic welding horn 59.

The sheet cutting station 2 comprises a pair of cutters (not illustrated in the drawings) spaced with respect to each other to cut a plastic sheet S to a predetermined width.

The sheet drawing station 3 includes a pair of rollers (3a, 3b) made of an elastomeric material such as natural rubber or synthetic rubber.

The sheet S is then fed to the pipe forming station 10 including a sheet rounding station 4 and a pipe shaping station 5. The sheet rounding station 4 comprises a sheet guiding member 42 with a tapered groove 43, a rod supporting member 41 and a core rod 57. The core rod 57 is supported only at one end by the rod supporting member 41 and extends toward the pipe shaping station 5. The core rod 57 passes through the tapered groove 43, extends coaxially with a cavity or through-hole of the mold mentioned later, and terminates at a position apart from the outlet of the mold 51.

The pipe shaping station 5 includes a mold 51, a forming rod 57, and a ultrasonic welding means 58. The mold 51 is divided into three parts, i.e., an upper left molding member 511, an upper right molding member 512 and a lower molding member 513 which are respectively grooved in their longitudinal direction to form a cylindrical cavity or through-hole 55 between them. The upper left molding member 511 is connected to an air cylinder 52 as shown in FIG. 2. Similarly, the upper right molding member 512 is connected to an air cylinder 53. The upper right and left molding members 511 and 512 are moved in the direction away from or close to the core rod 57 by the air cylinders 52 and 53 to open or close the mold. On the other hand, the lower molding member 513 is connected to an air cylinder 54 and is moved up and down by the air cylinder 54.

When producing the pipe, the upper right and left molding members 511 and 512 are moved inwardly or in the direction close to the core rod 57 by the air cylinders 52 and 53, while the lower molding member 513 is moved upwardly or in the direction close to the core rod 57 by the air cylinder 54. In the closed condition of the mold, however, the upper molding members 511 and 512 are arranged with a space between them to provide a long narrow cut or slit 56 for insertion of a welding horn 59 of the ultrasonic welding means 58.

The welding horn 59 of the ultrasonic welding means 58 is tapered so as to have a width approximately equal to the width of the slit 56 between the upper right and left molding members 511 and 512. The lower end of the horn 59 has a rectangular cross section and is inserted into the slit 56 during operation.

The pipe drawing station 6 is arranged next to the pipe forming station 10 and composed of a pair of rollers (now illustrated in the drawings). The rollers may be made of an elastomeric material such as natural rubber or synthetic rubber. The pipe cutting station 7 includes a cutting member so arranged as to cut the pipe in the direction perpendicular to the axis of the pipe.

Under the rest of operation, the mold parts are opened and rested at their respective rest positions. The opening of the mold is carried out by moving the molding members 511, 512 and 513 in the respective directions indicated by arrows A, B and C in FIG. 3. At the initial stage, the plastic sheet S is drawn manually from the sheet roll 13 and inserted into spaces between the core rod 57 and molding members 511, 512 and 513 through the guiding groove 43 of the guiding member 42. During the course of these operations, the sheet S is rounded into a cylindrical form with an overlapped portion of the opposing longitudinal sides thereof. After completing the set of the sheet S, all the operations are automatically carried out as mentioned below.

First, the mold 51 is closed by moving the molding members 511, 512 and 513 in the respective directions reverse to that of the arrows A, B and C in FIG. 3 until the molding members 511, 512 and 513 press the plastic sheet S against the core rod 57 as shown in FIGS. 2 and 3. Then, the welding horn 59 of the ultrasonic welding means 58 is inserted into the slit 56 between the upper molding members 511 and 512 until it presses the overlapped portion of the sheet S against the surface of the core rod 57. The overlapped portion of the sheet S is welded to form a cylindrical portion or a pipe by ultrasonic waves put out from the welding horn 59. Since the inner side of the overlapped portion of the sheet S is pressed against the surface of the core rod 57 during ultrasonic welding, no difference in level is produced in the inner surface of the pipe produced.

After the ultrasonic welding, the molding members 511, 512 and 513 are returned to the respective rest positions to open the mold 51. The welded cylindrical portion of the S is then drawn by the pipe drawing station 6. At the same time, a new part of the sheet S is drawn from the sheet roll 1 and fed to the pipe forming station 10 as the rollers of the sheet drawing station 3 and the pipe drawing station 6 are driven under the conditions synchronized with each other. Then, the drawing operation of the sheet drawing station 3 and the pipe drawing station 6 are stopped. The welded cylindrical portion of the sheet S fed to the pipe ejecting station 8 is cut off at the pipe cutting station 7 to provide a wrapping pipe with a desired length and then taken out from the pipe ejecting station 8. Then, the molding members 511, 512 and 513 are moved inwardly to close the mold 51 again and the above sequential operations are repeated.

During the sequential operations, the plastic sheet S fed from the sheet roll 1 is rounded into a cylindrical form so that opposing sides of the sheet are partially overlapped each other during passing through the sheet rounding station 4, and then formed into a pipe by welding the overlapped portion of the sheet with the ultrasonic welding means 58 during passing through the pipe shaping station 5.

As will be understood from the above, according to the present invention, the length and inside diameter of the pipe to be produced can be determined optionally by replacing the molding members and core rod and/or by adjusting the sheet cutting station and the pipe cutting station, thus making it possible to produce various kinds of wrapping pipes with a desired size.

EXAMPLES

Using the above device, there were produced pipes for wrapping a bundle of hollow fibers of an inside diameter of 30 mm and a length of 2000 mm with polypropylene sheets of a 0.3 mm thick, a 120 mm width and a center line mean roughness (Ra) shown in Table 1. The center line mean roughness (Ra) was measured with a contact type surface measuring system (Model TALY SURF-6, made by Rank Taylor Hobson Ltd.).

A bundle of ten thousand hollow fibers with a diameter of 230 $\mu$m was loaded into each of the resultant wrapping pipe to determine a rate of occurrence of fiber breakage or leakage. Results are shown in Table 1 along with the results for comparative specimens. In Table 1, the specimen with an asterisk indicates the wrapping pipe out of the scope of the present invention, and "SS" is an abbreviation for "supersonic".

The comparative specimens were produced by extrusion molding with polypropylene so as to have an inside diameter of 30 mm and a length of 2000 mm. Table 1 shows the center line mean roughness (Ra) for each specimen, with the measured surface roughness of the comparative specimens fell in the range of 1.6 to 3.0.

TABLE 1

| No. | Production | Ra ($\mu$m) | Breakage (%) | leakage (%) | Number of Samples |
| --- | --- | --- | --- | --- | --- |
| 1 | SS Welding | 3.1 | 1.0 | 0 | 100 |
| 2 | SS Welding | 3.7 | 0 | 0.74 | 270 |
| 3 | SS Welding | 4.3 | 0.3 | 3.2 | 1000 |
| 4* | SS Welding | 5.2 | 0.2 | 2.0 | 1000 |
| 5* | SS Welding | 6.0 | 0.13 | 5.8 | 1500 |
| 6* | Extrusion | 2.0 | 2.37 | 1.1 | 3000 |

TABLE 1-continued

| No. | Production | Ra ($\mu$m) | Breakage (%) | leakage (%) | Number of Samples |
| --- | --- | --- | --- | --- | --- |
| 7* | Extrusion | 2.3 | 1.11 | 1.85 | 270 |
| 8* | Extrusion | 2.6 | 0.32 | 2.61 | 7500 |
| 9* | Extrusion | 2.7 | 0.7 | 8.8 | 1000 |

As will be seen from the results shown in Table 1, the rate of occurrence of fiber breakage increases with decrease in Ra, while the rate of occurrence of the leakage increases with increase in Ra. Further, it is preferred to use the wrapping pipes of which inner surface has the center line mean roughness (Ra) ranging from 3.0 to 4.5. The observation of the inner surfaces of the specimens Nos. 4 and 5 with an electron microscope showed that the high rate of occurrence of leakage results from sharp embossments on their inner surface.

Accordingly, the present invention makes it possible to minimize the breakage and leaks of the hollow fibers during insertion into the wrapping pipes, which in turn makes it possible to improve the yield of the production of blood treatment devices. Further, it is possible to reduce the time required for readjustment or quality control of products, i.e., cylindrical containers loaded with a bundle of hollow fibers.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A wrapping pipe for wrapping a bundle of hollow fibers, said wrapping pipe being made of a plastic sheet which is welded at the opposing ends thereof by ultrasonic waves, and having an inner surface with a center line mean roughness (Ra) defined in JIS-B-0601 ranging from 3.0 to 4.5 $\mu$m, said wrapping pipe having a seam at the welded opposing ends and no difference in level of an inner surface of said seam.

2. The wrapping pipe according to claim 1 wherein the plastic sheet is of a material selected from the group consisting of olefin resins, polyesters and polytetrafluorethylene.

3. A wrapping pipe for wrapping a bundle of hollow fibers, said wrapping pipe consisting of a tubularly formed plastic sheet having a longitudinal weld portion formed by ultrasonic waves, the plastic sheet having an inner surface including a weld portion and a remainder portion, said weld portion merging with said remainder portion with substantially no difference in level of the inner surface, said inner surface having a center line mean roughness (Ra) defined in JIS-B-0601 ranging from 3.0 to 4.5 $\mu$m.

4. The wrapping pipe according to claim 3 wherein the plastic sheet is of a material selected from the group consisting of olefin resins, polyesters and polytetrafluorethylene.

* * * * *